United States Patent [19]

Shibata et al.

[11] Patent Number: 5,152,940
[45] Date of Patent: Oct. 6, 1992

[54] METHOD OF PRODUCING A LIGHT-TRANSMITTING SPINEL SINTERED BODY

[75] Inventors: Kenichiro Shibata; Hiroshi Nakamura, both of Itami, Japan

[73] Assignee: Sumitomo Electric Industries, Ltd., Osaka, Japan

[21] Appl. No.: 579,085

[22] Filed: Sep. 7, 1990

Related U.S. Application Data

[63] Continuation-in-part of Ser. No. 319,134, Mar. 6, 1989, abandoned.

[30] Foreign Application Priority Data

Mar. 9, 1988 [JP] Japan .................. 63-55843
Mar. 9, 1988 [JP] Japan .................. 63-55844
Jul. 5, 1988 [JP] Japan .................. 63-167616

[51] Int. Cl.$^5$ .............. B29D 11/00; F27B 9/04; B29C 43/10
[52] U.S. Cl. ............................ 264/1.2; 264/65; 264/570
[58] Field of Search .......... 264/1.2, 65, 66, 570; 252/584, 587; 501/153

[56] References Cited

U.S. PATENT DOCUMENTS

| | | | |
|---|---|---|---|
| 3,530,209 | 9/1970 | Ho ...................... | 264/65 |
| 3,562,371 | 2/1971 | Bush .................... | 264/66 |
| 3,974,249 | 8/1976 | Roy et al. ............ | 264/65 |
| 4,273,587 | 6/1981 | Oda et al. ........... | 501/153 |
| 4,461,750 | 7/1984 | Chess et al. ........ | 252/587 |
| 4,543,346 | 9/1985 | Matsui et al. ....... | 501/153 |
| 4,584,151 | 4/1986 | Matsui et al. ....... | 501/153 |
| 4,761,390 | 8/1988 | Hartnett et al. .... | 264/65 |

FOREIGN PATENT DOCUMENTS 2107166 5/1972 France .
8808829 11/1988 PCT Int'l Appl. .
2031399 9/1979 United Kingdom .

*Primary Examiner*—James Lowe
*Assistant Examiner*—Christopher A. Fiorilla
*Attorney, Agent, or Firm*—Wenderoth, Lind & Ponack

[57] ABSTRACT

A polycrystalline spinel sintered body is provided herein which is superior in light transmission, such that it can be used in an infrared light-transmitting window at a thickness of 2 mm or more. The present invention also provides a method of producing such light-transmitting spinel sintered body by hot pressing the spinel powders having high purity at temperatures of 1,200° to 1,700° C. and pressures of 100 to 500 kg/cm$^2$ to compact the sintered body until a density of 95% relative to the theoretical density is achieved and then subjecting the thus sintered compact to a hot isostatic pressure treatment at temperatures of 1400° to 1800° C. and pressures of 500 kg/cm$^2$ or more. Other variations of this basic method can be employed as disclosed in the specification. According to Applicants' method, a sintered body of high density and excellent light transmission can be achieved which is superior to prior art methods.

4 Claims, No Drawings

METHOD OF PRODUCING A LIGHT-TRANSMITTING SPINEL SINTERED BODY

This application is a division of application, Ser. No. 07/319,134 filed on Mar. 6, 1989 now abandoned.

DETAILED DESCRIPTION OF THE INVENTION

Field of the Invention

The present invention relates to a polycrystalline spinel sintered body superior in light transmission and a method of producing the same, in particular to a light-transmitting spinel sintered body having a high density suitable for using in an infrared light-transmitting window and the like which are used at thicknesses of 2 mm or more and a method of producing the same.

Prior Art

It has been known that a spinel ($MgAl_2O_4$) is an oxide consisting of magnesia ($MgO$) and alumina ($Al_2O_3$) and has a cubic crystal system, so that it is difficult for light to be scattered on the boundary surfaces of crystals, and in the case where it is sintered to a high density, excellent light transmission can be achieved.

Usually, the light transmission of the spinel sintered body is suddenly increased from the vicinity of a wavelength of 0.4 $\mu m$ in the visible range to amount to a maximum value in the vicinity of wavelengths of 3 to 5 $\mu m$ in the infrared range. Accordingly, the spinel sintered body has been promising as a light-transmitting material, such as an optical window, and attempts have been made to produce it various kinds of methods.

As disclosed in, for example, Japanese Patent Laid-Open No. Sho 47-6028, a method, in which lithium fluoride (LiF) is added as a sintering aid and the resulting mixture is hot pressed in vacuum, has been known.

In addition, a method, in which LiF is added to a mixture comprising $MgO$ and $Al_2O_3$ used in an equimolecular ratio or with a slight excess of $Al_2O_3$ as the sintering aid and the resulting mixture is sintered under normal pressure, is disclosed in Japanese Patent Laid-Open No. Sho 55-27837, also, a method, in which LiF is added to fine spinel powders, which are obtained by hydrolyzing aldoxide, and the resulting mixture sintered in hydrogen under normal pressure, is disclosed in Japanese Patent Laid-Open No. Sho 59-121158 likewise a method, in which a mixture comprising a highly pure $MgAl_2O_4$ material and ultra fine $Al_2O_3$ powders obtained by the aldoxide method is molded and then baked in vacuum or an atmosphere of hydrogen, (Japanese Patent Laid-Open No. Sho 62-72556), and the like have been known. It has been known that in this so-called normal-pressure sintering method (non-pressurizing sintering method), it is required to add the sintering aid and also calcium oxide (CaO) is effective in addition to the above described LiF.

In addition, in the normal pressure sintering method a sintered body having a composition comprising an excess of $MgO$ or a slight excess of $Al_2O_3$ is produced in addition to a sintered body having a composition comprising $Al_2O_3$ and $MgO$ in an equimolecular ratio of 0.5 : 0.5.

Problems to be Solved by the Invention

All of the above described conventional methods of producing a light-transmitting spinel sintered body have shown disadvantages in that the sintering aid, such as LiF, is added to compact it, so that the second phase is apt to appear, whereby light is scattered by the heterogeneous system, and thus the linear transmission is reduced.

Besides, the above described vacuum hot pressing method has showed disadvantages in that high temperatures of 1,300° to 1,600° C. and high pressures of 1,000 kg/cm² or more are required, so that mold materials, which have been usually used, such as graphite, are insufficient in strength. Further because of such high temperature and pressure it is difficult to produce large-sized sintered bodies, the facilities are must be large, the productivity is reduced, and the cost is increased. Disadvantages occur also in that a disk-like product can be obtained but products having other shapes can not be produced with a high yield.

In addition, in the latter normal pressure sintering method it is difficult to control the growth of grains and voids are apt to remain, so that the level of the light transmission is reduced. Also the case where the compositional ratio of $MgO$ and $Al_2O_3$ is changed in addition to the addition of the sintering aid, the second phase is apt to appear and light is scattered due to such a heterogeneous system, thereby further reducing the linear transmission.

As above described, the light-transmitting spinel sintered bodies produced by the conventional methods have shown a linear transmission, at a sample thickness of 1 mm, of at most about 75 to 80%, whereby, in order to use them in an infrared transmitting window, which is used at a thickness of sample of 2 mm or more, it is required to further improve the linear transmission.

Objects of the Invention

The present invention, has been achieved, in view of the above-mentioned circumstances. Thus, it is a first object of the present invention to provide a light-transmitting spinel sintered body having a high purity, a high density and a high level of light transmission and a linear transmission particularly suitable for an infrared transmitting window having a thickness of 2 mm or more and a method of producing the same. It is a second object of the present invention to provide a method of further promoting the compactization by subjecting the once sintered high density spinel sintered body to a subsequent hot isostatic pressure (HIP) treatment at high temperatures and pressures to obtain a spinel sintered body superior in light transmission, even though the wall-thickness of the material is large. In addition, it is a third object of the present invention to provide a method of further promoting the compactization by introducing a pressurized gas into a furnace during the sintering to efficiently and inexpensively produce a spinel sintered body superior in light transmission.

Measures for Solving the Problems

That is to say, it is a first object of the present invention to provide a light-transmitting spinel sintered body by hot pressing spinel powders in which the $Al_2O_3MgO$ molar ratio is essentially 0.5/0.5 and which have a purity of 99.5% or more and a specific surface area (BET value) of 10 m²/g or more at temperatures of 1,200° to 1,700° C. and pressures of 100 to 500 kg/cm² a vacuum to compact the powder until a density ratio relative to the theoretical one of 95% or more is achieved and then to subject it to an HIP treatment at temperatures of 1,400° to 1,800° C. and pressures of 500 kg/cm² or more, preferably pressures of 750-2000 kg/cm² and most preferably 750–1000 kg/cm$^2$. The light-transmitting spinel sintered body according to the first invention, which is obtained in the above described manner, is formed of a polycrystalline spinel sintered body having a purity of 99.5% or more and has a linear transmission; at a thickness of sample of 3 mm, of 65% or more on the average for visible and near infrared rays having wavelengths of 0.4 to 3μm and 75% or more at maximum for infrared rays having wavelengths of 3 to 5 μm, which is remarkably superior in comparison with that of the conventional spinel sintered bodies. This light transmission is suitable for a material of an infrared transmitting window.

In addition, it is an object of the second invention to provide a light-transmitting spinel sintered body having a still higher density superior in light transmission by subjecting fine spinel powders in which the Al$_2$O$_3$/MgO$_3$ molar ratio is essentially 0.5/0.5 and which have a purity of 99.9% or more and a specific surface area (BET value) of 10 m$^2$/g or more to isostatic molding at pressures of 1.0 ton/cm$^2$ or more to form a molded body having a density after molding of 2.0 g/cm$^3$ or more and then subjecting the molded body to a multi stage sintering for 2 to 24 hours at temperatures of 1,400° to 1,800° C. in vacuum or an atmosphere of hydrogen or helium to increase the density until 95% or more relative to the theoretical density is achieved. This is followed by further subjecting the resulting sintered body to an HIP treatment at temperatures of 1,400° to 1,800° C. and pressures of 500 to 2,000 kg/cm$^2$, preferably at pressures of 750 to 2000 kg/cm$^2$, and most preferably pressures of 750 to 1000 kg/cm$^2$ in an atmosphere of pressurized nitrogen gas, argon gas or oxygen gas. Furthermore, according to the third invention, highly pure and fine spinel powders having a purity of 99.9% or more and a specific surface area (BET value) of 10 m$^2$/g or more is isostatically molded at pressures of 1.0 ton/cm$^2$ or more to obtain a molded body having a density after molding of 2.0 or more and then the resulting molded body is subjected to a multi-stage sintering for 2 to 24 hours at temperatures of 1,400° to 1,800° C. in vacuum or an atmosphere of hydrogen or helium to increase the density thereof until 95% or more relative to the theoretical density, is achieved. This is followed by putting a pressurized nitrogen gas, argon gas, helium gas or mixture gas thereof having pressures of 10 to 150 kg/cm$^2$ into a furnace to provide a light-transmitting spinel sintered body having a still higher density superior in light transmission.

Operation

According to the above described first invention, the hot pressing in a vacuum and the subsequent HIP (hot isostatic pressing) can provide a spinel sintered body having a high density and a high linear transmission without adding sintering aids such as LiF.

The hot pressing is carried out at temperatures of 1,200° to 1,700° C. in vacuum. It is difficult to obtain a sintered body having a high density relative to the theoretical density of 95% or more at temperatures lower than 1,200° C. while MgO is evaporated in vacuum at temperatures exceeding 1,700° C. and Al$_2$O$_3$ (corundum) is apt to be deposited as a second phase when cooled, whereby the light transmission is reduced. In addition, in the case where the pressure of the hot press is less than 100 kg/cm$^2$, a sintered body having a high density relative to the theoretical density of 95% or more is difficult obtain whereas if the pressure of the hot press exceeds 500 kg/cm$^2$, it is difficult to use the conventional in view of its lack of strength.

Next, according to the HIP treatment in the first and second inventions, the surface of the spinel sintered body having a high density relative to the theoretical density of 95% or more obtained by the hot pressing or the sintering is pressurized in the isotropically compressed direction at high temperatures of 1,400° to 1,800° C. and high pressures of 500 to 2,000 kg/cm$^2$, so that the removal of voids is promoted by the plastic deformation and the diffusion mechanism, and thus the density is increased. In addition, according to the third invention, since the pressurized gas put into the furnace when sintered pressurizes the surface of the spinel sintered body having a high density relative to the theoretical density of 95% or more in the isotropically compressed direction by sintering, the removal of the voids within the spinel sintered body is promoted, and thus the density is increased still more. This effectively contributes to the improvement of light transmission. In the case where the density before the HIP treatment or before the pressurized gas is fed is less than 95% of the theoretical density, most of the residual voids are under the so-called opened condition so that the pressurized gas may get into the sintered body through these voids, whereby the increase of the density by the HIP treatment is not sufficiently achieved.

In addition, even though the sintered body having a sufficiently high density is obtained, the light transmission is reduced by the absorption by impurities which is not preferable.

Since the pressurized gas isotropically acts upon the spinel sintered body, the compactization due to the removal of voids is more strongly made progress in comparison with that in the conventional hot pressing method (pressurized in the up and down two directions at about 1,000 kg/cm2), whereby the sintered body having a uniform light transmission can be obtained.

Also the effects of making uniform the heterogeneous phase generated when sintered, is achieved.

Since the pressure of the pressurized gas according to the first and second inventions is high of 500 to 2,000 kg/cm$^2$, the removal effect of voids is increased in comparison with the conventional hot pressing method (at most 1,000 kg/cm$^2$), whereby a sintered body superior in light transmission can be obtained.

The pressurized gas preferably includes an argon gas, nitrogen gas, oxygen gas or mixture gas thereof. The addition of a slight quantity of oxygen gas prevents the light transmission from being reduced due to the deoxidation from the spinel sintered body during the HIP treatment.

In addition, since the pressure of the pressurized gas according to the third invention is 10 to 150 kg/cm$^2$, the usual high-pressure cylinder can be used as it is, whereby no special pressurizing apparatus is required, so that the cost of facilities is relatively inexpensive.

The use of an inert gas, such as a nitrogen gas, a helium gas, an argon gas or a mixture gas thereof, is safe and easily available as the pressurized gas. However, also a gas including some quantity of hydrogen gas can be used.

According to the above described second and third inventions, the sintering before the pressurized gas is fed is carried out in a multi-stage manner but the incorporation of gases having large diameters, such as nitrogen and argon, into the residual voids in the process of increasing the density by sintering the spinel molded body leads to the obstruction of the subsequent increase of density, so that this sintering is preferably carried out in an atmosphere of hydrogen and helium having a small molecular diameter.

It is preferable to heat the sintered body for 2 to 24 hours at temperatures of 1,400° to 1,800° C. because this can increase the density of the sintered body until 95% or more of the theoretical, density in the first sintering stage is achieved.

In addition, if the sintering aids, such as CaO and LiF, are added, the increase of the density until it reaches 95% or more relative to the theoretical density can be easily achieved even by holding for a short time to an extent of 4 to 10 hours.

In order to prevent the light transmission from being reduced due to the absorption by the impurities, the spinel powders having a purity of 99.5% or more are used in the present invention. In particular, the inclusion of transition metal elements, such as Fe, is undesired. In addition, in order to obtain a compactized sintered body, it is necessary that the particle diameter of primary particles of the spinel powders is about 0.2 $\mu$m or less, that is, the specific surface area should be 10 $m^2/g$ or more in BET value. Substances, which are obtained by hydrolyzing alkoxides, and the like are suitable for such the highly pure and fine spinel material powders.

In addition, in the first invention, in particularly, it is unnecessary to add the sintering aids, such as LiF and CaO, so that the reduction of the transmission due to the second phase is not reduced as in the conventional sintered bodies.

Sintering aids such as CaO and LiF are not necessary in the second and third inventions although it may be used in certain instances to achieve a high density in a short time. It is, however, one of the principal features of the invention to carry out such sintering procedure without the use of sintering aids.

According to the above described production method of the present invention, there can be obtained a light-transmitting spinel sintered body having a linear transmission at a sample thickness of 3 mm of 65% or more for visible and near infrared rays having wavelengths of 0.4 to 3 $\mu$m and 75% or more for infrared rays having wavelengths of 3 to 5 $\mu$m, which are remarkably superior to a conventionally spinal sintered bodies.

Preferred Embodiments

The present invention will be described below in more detail with reference to the preferred embodiments. In the following examples, the spinel powders used as the raw materials are such that the $Al_2O_3/MgO$ molar ratio is 0.5/0.5.

EXAMPLE 1

Highly pure spinel powders having the purity of 99.9% and a specific surface area (BET value) of 14 $m^2/g$ were subjected to a hot pressing for 2 hours in a graphite mold having an inside diameter of 50 mm at a temperature of 1,400° C. and a pressure of 300 $kg/cm^2$ in vacuum of $1 \times 10^{-1}$ torr to obtain a white sintered body having a density relative to the theoretical density of 97%. Then, the resulting sintered body was put in an HIP apparatus to be subjected to an HIP treatment for 2 hours at a temperature of 1,600° C. and a pressure of 2,000 $kg/cm^2$ by the use of an Ar gas. The resulting spinel sintered body was externally colorless and transparent.

This spinel sintered body was subjected to an mirror finishing until a thickness of 3 mm is achieved and the linear transmission measured by means of a spectrophotometer with the result that the light transmission was superior to an extent of 85% at maximum for an infrared range having wavelengths of 3 to 5 $\mu$m and 75% on the average for a range having wavelengths of 0.4 to 3 $\mu$m.

EXAMPLE 2

Highly pure spinel powders having a purity of 99.7% and a specific surface area (BET value) of 11 $m^2/g$ were subjected to hot pressing for 1 hour in a graphite mold having an inside diameter of 50 mm at a temperature of 1,600° C. and a pressure of 200 $kg/cm^2$ in a vacuum of $3 \times 10^{-3}$ torr to obtain a white sintered body having a density relative to the theoretical density of 96%.

The resulting sintered body was put in an HIP apparatus to be subjected to an HIP treatment for 3 hours at a temperature of 1,700° C. and a pressure of 1,000 $kg/cm^2$ by the use of a $N_2$ gas The resulting spinel sintered body was externally colorless and transparent.

This spinel sintered body was subjected to a mirror finishing until a thickness of 3 mm is achieved and the linear transmission measured by means of a spectrophotometer with the result that the light transmission was superior to an extent of 83% at maximum for an infrared range having wavelengths of 3 to 5 $\mu$m and 73% on the average for a range having wavelengths of 0.4 to 3 $\mu$m.

EXAMPLE 3

Highly pure spinel powders having a purity of 99.8% and a specific surface area (BET value) of 20 $m^2/g$ were subjected to hot pressing for 3 hours in a graphite mold having an inside diameter of 50 mm at a temperature of 1,300° C. and a pressure of 400 $kg/cm^2$ in a vacuum of $8 \times 10^{-2}$ torr to obtain a white sintered body having a density relative to the theoretical density of 98%.

The resulting sintered body was put in an HIP apparatus to be subjected to an HIP treatment for 2.5 hours at a temperature of 1,500° C. and a pressure of 1,500 $kg/cm^2$ by the use of a mixture gas of Ar-5% $O_2$. The resulting spinel sintered body was externally colorless and transparent.

This spinel sintered body was subjected to a mirror finishing until a thickness of 3 mm is achieved and the linear transmission measured by means of a spectrophotometer with the result that the light transmission was superior to an extent of 82% in maximum for an infrared range having wavelengths of 3 to 5 $\mu$m and 75% on the average for a range having wavelengths of 0.4 to 3 $\mu$m.

EXAMPLE 4

LiF was added to highly pure spinel powders having the purity of 99.9% and a specific surface area (BET value) of 14 $m^2/g$ in a quantity of 0.2% and the resulting mixture was subjected to the wet mixing for 24 hours in an alumina ball. The resulting mixture powders were dried and then subjected to isostatic molding in a rubber mold having a diameter of 30 mm at a pressure of 2.0 $ton/cm^2$ to obtain a molded body having a specific gravity of 2.2.

The resulting molded body was temporarily sintered for 3 hours at a temperature of 1,100° C. in a hydrogen furnace and then sintered for 24 hours at a temperature of 1,800° C. to obtain a sintered body having a density relative to the theoretical density of 98% or more. The resulting sintered body was put in the HIP apparatus and held for 1 hour at a temperature of 1800° C. and under a pressure of 2000 kg/cm² by the use of a mixture gas 10% O₂-Ar.

The resulting spinel sintered body was subjected to a mirror finishing until a thickness of 3 mm is achieved and the transmission measured by means of an infrared spectrophotometer with the result that the light transmission was superior to an extent of 84% in maximum for an infrared range having wavelengths of 3 to 4 μm.

EXAMPLE 5

The sintered body, which had been obtained by temporarily sintering in EXAMPLE 4, was put in a separate furnace to hold for 2 hours at a temperature of 1,100° C. under vacuum and then 10 hours at a temperature of 1,700° C. in a helium gas of 1 atmospheric pressure. Subsequently, an argon gas having a pressure of 100 kg/cm² was introduced into the furnace without delay to hold the sintered body for 1 hour at 1,700° C.

The resulting spinel sintered body was subjected to a mirror finishing until a thickness of 2 mm is achieved to and the transmission measured by means o fan infrared spectrophotometer with the result that the light transmission was superior to an extent of 82% for an infrared range having wavelengths of 3 to 4 μm.

Although, LiF was added as a sintering aid in Examples 4 and 5, essentially the same results are achieved when such sintering aid is omitted.

The light-transmitting spinel bodies of the present invention also have excellent thermal and mechanical properties. Thus, the sintered bodies have a highly dense microstructure of a relatively small uniform grain size ranging from 5 to 100 μm,. This fine gained structure makes for spinel bodies having greatly improved strength characteristics. For example, the flexural strength of the spinel ceramics produced according to the present invention is excellent ranging form 120-250 kg/mm².

The following table illustrates the typical mechanical and properties of the spinel ceramic MgAl₂O₄ produced according to Example 1 of the present invention.

TABLE I

| Properties | MgAl₂O₄ |
|---|---|
| Average Grain Size (μm) | 15 |
| Density (g/cm³) | 3.58 |
| Melting Point (°C.) | 2130 |
| Flexural Strength (MPa) | 190 |
| Young's Modulus (GPa) | 270 |
| Poisson's ratio | 0.26 |
| Knoop Hardness | 1400 |
| Thermal Expansion (10⁻⁶/K) Coefficient | |
| 25-200° C. | 6.7 |
| 25-500° C. | 7.7 |
| Thermal Conductivity (W/mK) | 16.9 |
| Refractive Index (4 μm) | 1.685 |
| Absorption Coefficient (cm⁻¹) | |
| λ = 4.5 μm | 0.21 |
| λ = 5.0 μm | 0.62 |
| Thermal Shock | 1.14 |

TABLE I-continued

| Properties | MgAl₂O₄ |
|---|---|
| Resistance R' | |

According to the table, the R' value is obtained from the following formula $$R' = \frac{\sigma(1-v)K}{E\alpha}$$

where $\sigma$=flexural strength (MPa), $v$=Poisson's ratio, $K$=thermal conductivity (W/mK), $E$=Young's Modulus (GPa) and $a$=thermal expansion coefficient ($10^{-6}$/K).

It can be seen from the above that the mechanical and thermal properties of the sintered bodies produced according to the methods of the present invention are indeed excellent. The light-transmitting spinel sintered bodies have a high density and remarkably superior linear transmission properties in the visible and infrared range which can be achieved without the use of sintering aids.

In addition, according to the second invention, the spinel sintered body having a high density and a superior light transmission can be obtained by sintering the spinel molded body until a high density is achieved and further subjecting it to an HIP treatment at high temperatures and pressures. Besides, according to the third invention, the spinel sintered body having a high density and a superior light transmission can be efficiently obtained by sintering the spinel molded body until the high density and then putting the pressurized gas into the furnace.

Thus, all of the light-transmitting spinel sintered bodies obtained according to the first to third inventions of the present invention are superior in light transmission, so that they are particularly useful as a material for an infrared transmission window used at thicknesses of 2 mm or more.

What is claimed is:

1. A method of producing a light-transmitting spinel sintered body, characterized in that a spinel power free of sintering aids and having a purity of 99.5% or more and a specific surface area (BET value) of 10 m²/g or more is subjected to hot pressing in a vacuum at temperatures of 1,200° to 1,700° C. and pressures of 100 to 500 kg/cm² t sinter and compact the powder until a density relative to the theoretical density of 95% or more is achieved and then subjecting the thus-produced compact to a hot isostatic pressure treatment at temperatures of 1,400° to 1,800° C. and pressures of 500 kg/cm² or more.

2. A method of producing a light-transmitting spinel sintered body as set forth in claim 1, characterized in that a gas selected from the group consisting of argon, nitrogen, oxygen or a mixture thereof is used in said hot isostatic pressure treatment.

3. A process according to claim 1 in which the spinel powders used to produce the spinel sintered body are such that the Al₂O₃/MgO molar ratio is 0.5/0.5.

4. A method according to claim 1 wherein the hot isostatic pressure treatment is conducted at a pressure of 750 Kg/cm² to 2000 kg/cm².

* * * * *